(12) United States Patent
Kuwano et al.

(10) Patent No.: US 9,187,000 B2
(45) Date of Patent: Nov. 17, 2015

(54) BATTERY PACK AND ELECTRICALLY DRIVEN AUTOMOBILE

(71) Applicant: KABUSHIKI KAISHA TOSHIBA, Tokyo (JP)

(72) Inventors: Yuuki Kuwano, Tokyo (JP); Fumiyuki Yamane, Kanagawa (JP); Takashi Akiba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 274 days.

(21) Appl. No.: 13/966,084

(22) Filed: Aug. 13, 2013

(65) Prior Publication Data
US 2014/0077731 A1    Mar. 20, 2014

(30) Foreign Application Priority Data
Sep. 18, 2012    (JP) .................. 2012-205014

(51) Int. Cl.
| | |
|---|---|
| H02P 1/00 | (2006.01) |
| H02P 3/00 | (2006.01) |
| H02P 5/00 | (2006.01) |
| B60L 11/18 | (2006.01) |
| H02J 7/00 | (2006.01) |

(52) U.S. Cl.
CPC ......... *B60L 11/1809* (2013.01); *B60L 11/1803* (2013.01); *B60L 11/1816* (2013.01); *B60L 11/1862* (2013.01); *B60L 11/1866* (2013.01); *H02J 7/0019* (2013.01); *H02J 7/0021* (2013.01); *B60L 2240/545* (2013.01); *B60L 2240/547* (2013.01); *B60L 2240/549* (2013.01); *Y02T 10/7005* (2013.01); *Y02T 10/7044* (2013.01); *Y02T 10/7055* (2013.01); *Y02T 10/7061* (2013.01); *Y02T 90/14* (2013.01)

(58) Field of Classification Search
CPC ..................... Y02T 10/7055; H01M 10/441
USPC ........................................................ 318/139
See application file for complete search history.

(56) References Cited

U.S. PATENT DOCUMENTS

| | | | |
|---|---|---|---|
| 2007/0221627 A1* | 9/2007 | Yugou et al. .................. | 218/136 |
| 2011/0076530 A1* | 3/2011 | Miyamoto et al. .............. | 429/61 |
| 2012/0105065 A1* | 5/2012 | Namou et al. ................ | 324/415 |

FOREIGN PATENT DOCUMENTS

JP         2008-278635         11/2008

* cited by examiner

*Primary Examiner* — Erick Glass
(74) *Attorney, Agent, or Firm* — Patterson & Sheridan, LLP

(57) ABSTRACT

A battery pack for an electrically driven automobile includes plural battery banks, a battery management unit that detects current flows, voltages and temperatures, first and second terminals connected respectively to the positive and negative electrode terminals of the battery banks, plural third and fourth terminals connected respectively to the positive and negative electrode terminals of the battery banks, a main contactor that switches the connection between the positive electrode terminals of the battery banks and the first terminal and the connection between the negative electrode terminals of battery banks and the second terminal, sub-contactors that switch the connection between the positive electrode terminals of the battery banks and the first terminal, and charging sub-contactors that switch the connection between the positive electrode terminals of the battery banks and the third terminals and the connection between the negative electrode terminals of the battery banks and the fourth terminals, respectively.

8 Claims, 7 Drawing Sheets

BATTERY PACK AND ELECTRICALLY DRIVEN AUTOMOBILE

CROSS-REFERENCE TO RELATED APPLICATION

This application is based upon and claims the benefit of priority from Japanese Patent Application No. 2012-205014, filed Sep. 18, 2012, the entire contents of which are incorporated herein by reference.

FIELD

Embodiments described herein generally relate to a battery pack and an electrically driven automobile.

BACKGROUND

In recent years, in order to meet the demand for preventing global warming by cutting $CO_2$ exhaustion, electrically driven automobiles are being actively marketed. In addition to conventional sedans and motorbikes, companies are developing electrically driven buses, trucks and other large size vehicles.

Accordingly, there has been a demand for developing technology for quickly charging battery packs carried on electrically driven automobiles. In order to realize this, in the related art, a quick charger have been proposed. If charging can be carried out at up to 50 kW by the quick charger, an onboard battery pack of about 24 kWh can be nearly fully charged in about 30 min.

However, for large size vehicles, the energy needed for running is higher than that for sedans, so that the capacity of the battery pack carried on such vehicles is naturally higher. When a high capacity onboard battery pack is charged by using the conventional quick charger, due to the restriction on maximum output power and maximum current, it is difficult to fully charge in a short time. For example, for a 50 kWh onboard battery pack, it takes about 1 hour to charge it with the quick charger.

Buses, trucks and other large size vehicles run according to their predetermined round schedules, respectively. When it takes a long time to charge the onboard battery pack, it is difficult to make sufficient charging for the battery pack between two rounds of running along the round schedule. In such a case, it is necessary to use more large size vehicles to realize the related round schedule. As a result, the operation efficiency decreases.

DETAILED DESCRIPTION

Embodiments provide solutions to the problems of the related art by providing a battery pack and an electrically driven automobile that allows charging in a short time.

In general, in the following, the battery packs and the electrically driven automobiles according to embodiments will be explained with reference to the drawings.

A battery pack includes plural battery banks each including plural battery cells, which are connected in parallel with each other, battery management systems that detect currents flowing in the battery banks and voltages and temperatures of the plural battery cells, a first charging/discharging terminal connected to positive electrode terminals of the plural battery banks, a second charging/discharging terminal connected to negative electrode terminals of the plural battery banks, plural first charging terminals connected to the positive electrode terminals of the plural battery banks, respectively, a second charging terminal connected to the negative electrode terminals of the plural battery banks, main contactors that switch the connection between the positive electrode terminals of the plural battery banks and the first charging/discharging terminal and the connection between the positive electrode terminals of the plural battery banks and the second charging/discharging terminal, sub-contactors that switch the connection between the positive electrode terminals of the plural battery banks and the first charging/discharging terminal, and charging sub-contactors that switch the connection between the positive electrode terminals of the plural battery banks and the first charging terminal and the connection between the negative electrode terminals of the plural battery banks and the second charging terminals, respectively.

Figure 1:
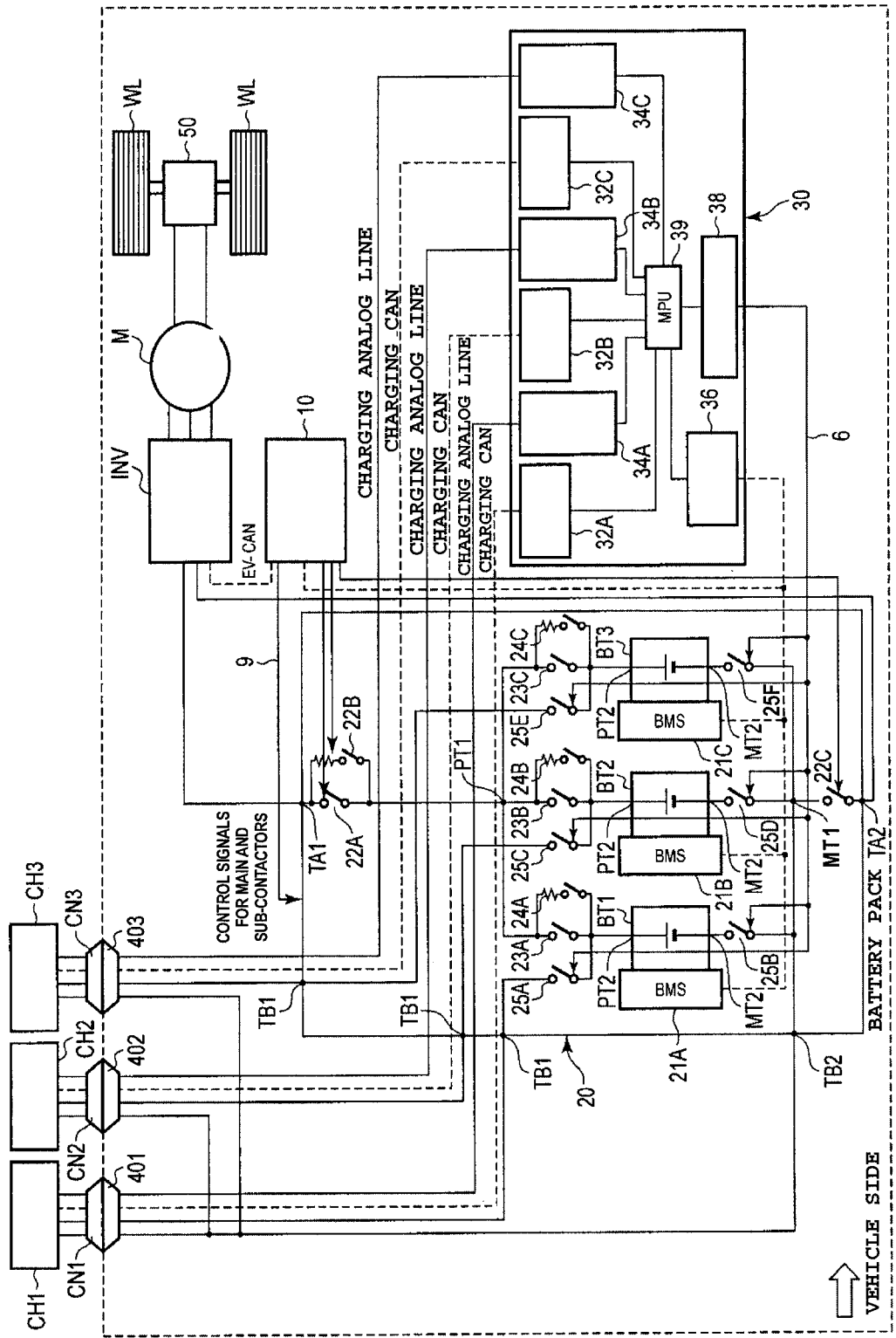
FIG. 1 is a block diagram schematically illustrating a battery pack and an electrically driven automobile according to a first embodiment.

FIG. 1 is a block diagram schematically illustrating an example of the configuration of the battery pack and the electrically driven automobile of the first embodiment.

The electrically driven automobile in this embodiment includes a motor M, an inverter INV, a vehicle ECU 10, a charging ECU 30, a battery pack 20, plural charging ports 401 through 403, a power transmission unit 50, and driving wheels WL.

According to the torque instruction received from the vehicle ECU (electric control unit) 10, the inverter INV converts the DC power of the battery pack 20 to a 3-phase AC power, and outputs the power to the motor M.

For example, the motor M is a permanent magnet type motor, and the motor M is driven by the 3-phase AC power output from the inverter INV.

The power transmission unit 50 is an apparatus that transmits the torque of the motor M to the vehicle shaft and the driving wheels WL, and includes a reduction gear unit, a differential gear unit, etc.

The battery pack 20 includes plural battery banks BT1, BT2, BT3 connected in parallel with each other, battery management systems (BMS: battery management systems) 21A, 21B, 21C, a main contactor 22, sub-contactors 23A through 23C, precharge sub-contactors 24A through 24C, charging sub-contactors 25A through 25F, a first charging/discharging terminal TA1, a second charging/discharging terminal TA2, a first charging terminal TB1, and a second charging terminal TB2. The main contactor 22 includes a first main contactor 22A, a second main contactor 22B, and a third main contactor 22C.

The plural battery banks BT1, BT2, BT3 respectively include plural battery cells (not shown), each having a positive electrode terminal PT2 and a negative electrode terminal MT2. The positive electrode terminals PT2 of the battery banks BT1 through BT3 are connected in parallel with each other and are each connected to a positive electrode terminal PT1 in series. Also, the negative electrode terminals MT2 of the battery banks BT1 through BT3 are connected in parallel with each other and are each connected to a negative electrode terminal MT1 in series. In each of the battery banks BT1, BT2, BT3, plural battery cells are lithium ion secondary batteries. For example, hundreds of battery cells are connected in series therein.

The battery management systems 21A, 21B, 21C are attached on the battery banks BT1, BT2, BT3, respectively. The battery management systems 21A, 21B, 21C each have sections (not shown) for receiving the data of voltages and the charging/discharging currents of the battery cells from the battery banks BT1, BT2, BT3, and the temperatures near the battery cells, and for computing the SOC (state of charge), SOH (state of health), and internal resistance values of the battery banks BT1, BT2, BT3, and, at the same time, they monitor the voltages and temperatures, etc. to protect the battery cells.

The battery management systems 21A, 21B, 21C notify the vehicle ECU 10 and the charging ECU 30 about the state of charge, soundness, the voltages of the battery cells, the temperatures near the battery cells, the charging/discharging currents, the internal resistance values of the battery cells, and other states of the battery banks BT1, BT2, BT3. According to the present embodiment, the battery management systems 21A, 21B, 21C carry out communication with the vehicle ECU 10 and the charging ECU 30 via a communication line on the basis of the CAN (control area network) communication standard.

The first charging/discharging terminal TA1 is connected, via the positive electrode terminal PT1, to the positive electrode terminals PT2 of the plural battery banks BT1 through BT3. The second charging/discharging terminal TA2 is connected, via the negative electrode terminal MT1, to the negative electrode terminals MT2 of the plural battery banks BT1 through BT3. The first charging/discharging terminal TA1 and the second charging/discharging terminal TA2 output the discharge currents from the plural battery banks BT1 through BT3 to the inverter INV, and the battery management systems 21A through 21C output the charging current (regenerating current) from the inverter INV to the plural battery banks BT1 through BT3.

The first charging terminals TB1 are connected to the positive electrode terminals PT2 of the plural battery banks BT1 through BT3, respectively. In this embodiment, there are three first charging terminals TB1 corresponding to the three battery banks BT1 through BT3 of the battery pack 20, respectively. The second charging terminal TB2 is connected to the negative electrode terminals MT2 of the battery banks BT1 through BT3, respectively. According to the present embodiment, the battery pack 20 includes one second charging terminal TB2 connected to all of the negative electrode terminals MT2 of the three battery banks BT1 through BT3. The first charging terminals TB1 and the second charging terminal TB2 output the charging currents from the chargers CH1 through CH3 connected to the charging ports 401 through 403 to the battery banks BT1 through BT3, respectively.

The first main contactor 22A switches the connection/disconnection between the positive electrode side input terminal of the inverter INV and the battery pack 20. In other words, the first main contactor 22A switches the connection/disconnection between the first charging/discharging terminal TA1 and the positive electrode terminals PT1. The second main contactor 22B is a precharge contactor that switches the connection/disconnection between the resistor, connected in parallel with the first main contactor 22A, and the positive electrode terminal PT1, and the register and the positive electrode terminal PT1 are connected by the second main contactor 22B before the first charging/discharging terminal TA1 and positive electrode terminal PT1 are connected by the first main contactor 22A for preventing a large current from flowing to the battery banks BT1, BT2, BT3. The third main contactor 22C switches the connection/disconnection between the negative electrode side input terminal of the inverter INV and the battery pack 20. In other words, the third main contactor 22C switches the connection/disconnection between the second charging/discharging terminal TA2 and the negative electrode terminals MT1. The operation of the main contactor 22 is under control of the vehicle ECU 10.

The sub-contactors 23A through 23C switch the connection/disconnection between the positive electrode terminals PT2 of the plural battery banks BT1 through BT3 and the first charging/discharging terminal TA1. In other words, the sub-contactor 23A switches the connection/disconnection between the positive electrode terminal PT2 of the battery bank BT1 and the positive electrode side input terminal of the inverter INV. The sub-contactor 23B switches the connection/disconnection between the positive electrode terminal PT2 of the battery bank BT2 and the positive electrode side input terminal of the inverter INV. The sub-contactor 23C switches the connection/disconnection between the positive electrode terminal PT2 of the battery bank BT3 and the positive electrode side input terminal of the inverter INV.

The operation of the sub-contactors 23A through 23C is under control by the vehicle ECU 10, and they are set to connection state when the ignition IGN is on, and they are set to disconnection state when the ignition IGN is off.

The precharge sub-contactor 24A is a contactor that switches the connection/disconnection between the resistor connected in parallel with the sub-contactor 23A and the positive electrode terminal PT2. The precharge sub-contactor 24A is set to connection state, before the sub-contactor 23A is set to connection state, to prevent a large current from flowing in the battery bank BT1 when the battery banks BT1 through BT3. The precharge sub-contactor 24B is a contactor that switches the connection/disconnection between the resistor connected in parallel with the sub-contactor 23B and the positive electrode terminal PT2. The precharge sub-contactor 24B is set to connection state, before the sub-contactor 23B is set to connection state, to prevent a large current from flowing in the battery bank BT2 when the battery banks BT1 through BT3. The precharge sub-contactor 24C is a contactor for switching the connection/disconnection between the resistor connected in parallel with the sub-contactor 23C and the positive electrode terminal PT2, and the precharge sub-contactor 24A is set to connection state, before the sub-contactor 23C is set to connection state, to prevent a large current from flowing in the battery bank BT3. The operation of the precharge sub-contactors 24A through 24C is under control by the vehicle ECU 10.

The charging sub-contactors 25A through 25F switch the connection/disconnection between the positive electrode terminals PT2 of the plural battery banks BT1 through BT3 and the first charging terminals TE1 and the connection between the negative electrode terminals MT2 of the plural battery banks BT1 through BT3 and the second charging terminal TB2.

In other words, the charging sub-contactor 25A switches the connection/disconnection between the positive electrode terminal PT2 of the battery bank BT1 and the charging port 401. The charging sub-contactor 25B switches the connection/disconnection of the negative electrode terminal MT2 of the battery bank BT1 with the charging port 401 and the connection/disconnection with the negative electrode side input terminal of the inverter INV.

The charging sub-contactor 25C switches the connection/disconnection between the positive electrode terminal PT2 of the battery bank BT2 and the charging port 402. The charging sub-contactor 25D switches the connection/disconnection of the negative electrode terminal MT2 of the battery bank BT2 with the charging port 402 and the connection/disconnection with the negative electrode side input terminal of the inverter INV.

The charging sub-contactor 25E switches the connection/disconnection between the positive electrode terminal PT2 of the battery bank BT3 and the charging port 403. The charging sub-contactor 25F switches the connection/disconnection of the negative electrode terminal MT2 of the battery bank BT3 with the charging port 403 and the connection/disconnection with the negative electrode side input terminal of the inverter INV.

The operation of the charging sub-contactors 25A through 25F is under control of the charging ECU 30. Here, when the ignition of the electrically driven automobile is off, the charging sub-contactors 25A through 25F are in the electrically disconnected state.

The charging ECU 30 detects the presence of connection of the charging connectors CN1, CN2, CN3 to the charging ports 401, 402, 403, and further controls the charging currents to the battery banks BT1 through BT3 under the charging control instruction from the vehicle ECU 10.

The charging ECU 30 includes plural CAN interfaces 32A through 32C and plural analog interfaces 34A through 34C (first interface circuits). These interface circuits are one-to-one connected to the chargers. The charging ECU 30 includes the CAN interface circuits 32A, 32B, 32C, analog interface circuits 34A, 34B, 34C, a CAN interface circuit (second interface circuit) 36, a contactor driver 38, and a micro processing unit (MPU) 39.

The CAN interface circuits 32A, 32B, 32C make communication with the chargers CH1, CH2, CH3 via the respective charging ports 401, 402, 403 and charging connectors CN1, CN2, CN3 for the information of the chargers CH1, CH2, CH3 as well as the instruction values of the charging currents.

The analog interface circuits 34A, 34B, 34C make communication via the respective charging ports 401, 402, 403 and charging connectors CN1, CN2, CN3 for the control signals for start of charging, prohibition of charging, etc.

The CAN interface circuit 36 makes communication with the battery management systems 21A, 21B, 21C and the vehicle ECU 10, respectively. The CAN interface circuit 36 receives from the battery management systems 21A, 21B, 21C the information of voltages, temperatures, charging/discharging currents, state of charges, etc. of the battery cells contained in the battery banks BT1, BT2, BT3, respectively. In addition, the CAN interface circuit 36 sends to the vehicle ECU 10 the information about the start and stop of charging, etc. for vehicle ECU 10, and, at the same time, it receives the control signal for prohibition of charging from the vehicle ECU.

The contactor driver 38 drives and controls the charging sub-contactor 25 that switches the connection/disconnection between the battery banks BT1, BT2, BT3 and the charging ports 401, 402, 403.

On the basis of the information received from the various interface circuits, the MPU 39 controls the operation of the contactor driver 38, and outputs the control signals, such as start/stop of charging, charging current instruction value, etc.

The vehicle ECU 10 includes a main central processing unit (CPU) as an arithmetic and logic operation means, a memory, a digital interface (not shown), and an analog interface (not shown). The vehicle ECU 10 coordinates the various equipments carried onboard the electrically driven automobile, and controls the overall electrically driven automobile. When the user starts the electrically driven automobile, the vehicle ECU 10 acquires the information of the battery banks BT1, BT2, BT3 of the battery pack 20 from the battery management systems 21A, 21B, 21C, and it carries out the driving control for the main contactor 22, the sub-contactor 23 and the precharge sub-contactor 24.

The chargers CH1 through CH3 are connected to the plural charging ports 401 through 403, respectively. According to the present embodiment, the chargers CH1 through CH3 are, e.g., the quick chargers corresponding to the quick charging method according to CHAdeMO™, and the charging ports 401 through 403 and the charging connectors CN1 through CN3 correspond to the quick chargers.

Figure 2:
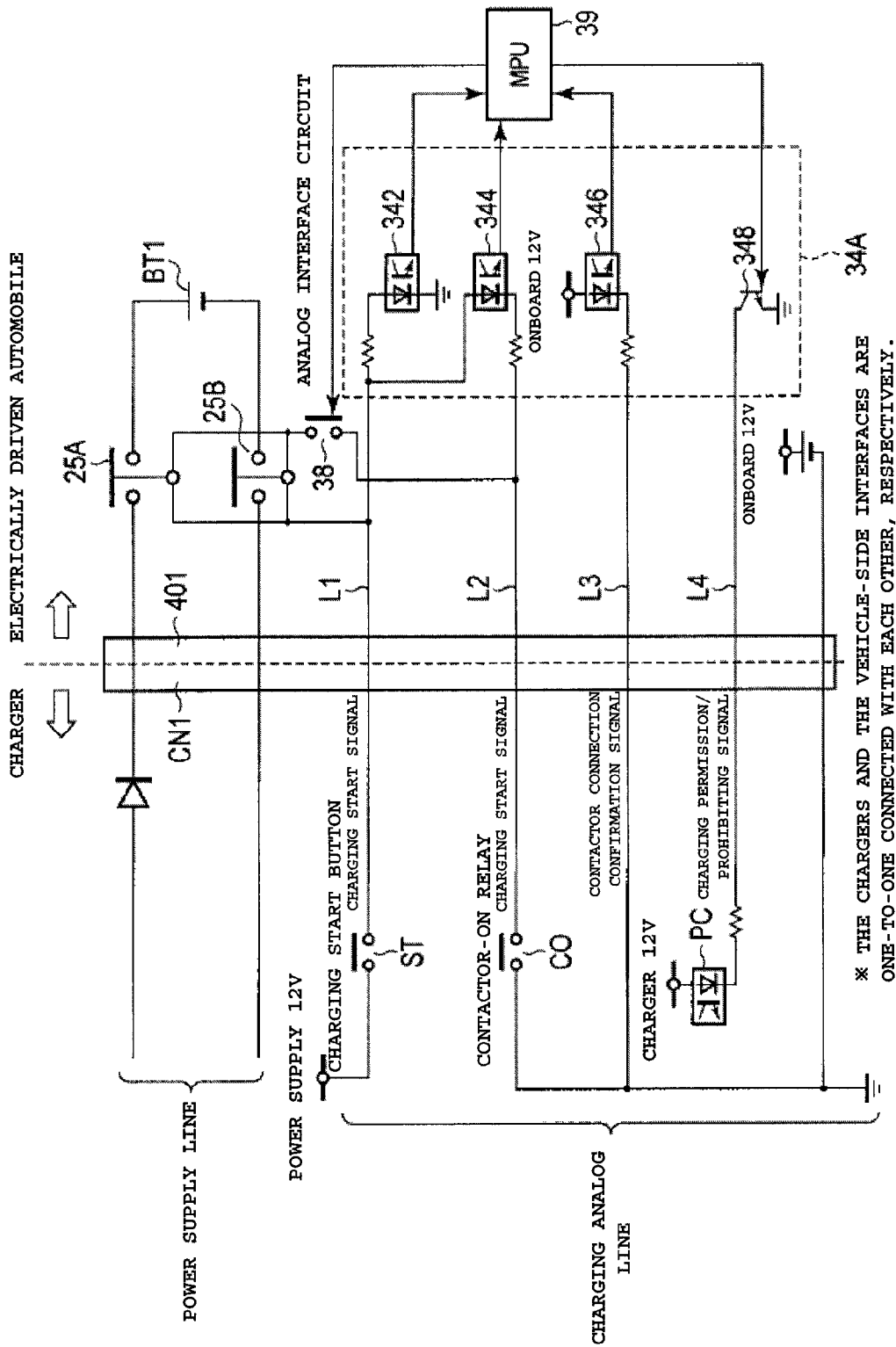
FIG. 2 is a schematic diagram illustrating a connection between the electrically driven automobile and the charger according to the first embodiment.

FIG. 2 is a schematic diagram illustrating an example of the configuration of the connection between the electrically driven automobile and the charger according to the present embodiment. In this embodiment, the chargers CH1 through CH3 are respectively connected to one of the interfaces of the electrically driven automobile. FIG. 2 shows the state in which the charging port 401 and the charging connector CN1 are connected with each other. Similar configuration is adopted for the chargers CH2 and CH3, which are connected to the charging ports 402 and 403 via charging connectors CN2 and CN3, and the analog interface circuits 34B and 34C.

The charging analog line connected between the charger CH1 and the analog interface circuit 34A includes a first charging start signal line L1, a second charging start signal line L2, a connector connection confirmation signal line L3, a the charging permission/prohibiting signal line L4.

The analog interface circuit 34A of the charging ECU 30 includes a first insulating switch 342, a second insulating switch 344, a third insulating switch 346, and a switch 348.

The first insulating switch 342 may be a photocoupler, which includes an anode side (the collector side) connected via the charging start button of the charger CH1 and the first charging start signal line L1 to the power supply (12 V) of the charger CH1, and, at the same time, which includes a cathode side (the emitter side) that is grounded.

The second insulating switch 344 may be a photocoupler, which includes an anode side (the collector side) connected via the charging start button of the charger CH1 and the first charging start signal line L1 to the power supply (12 V) of the charger CH1, and, at the same time, which includes a cathode side (the emitter side) connected to the second charging start signal line L2. The second charging start signal line L2 is grounded via the collector-on relay CO of the charger CH1.

The third insulating switch 346 may be a photocoupler, which includes an anode side (the collector side) connected to the onboard power supply (e.g., a 12 V lead storage battery), and, at the same time, which includes a cathode side (the emitter side) connected to the connector connection confirmation signal line L3. The connector connection confirmation signal line L3 is grounded in the charger CH1.

The switch 348 may be, for example, a transistor, which includes collector connected to the charging permission/prohibiting signal line L4. The charging permission/prohibiting signal line L4 is electrically connected to the power supply (12 V) via the photocoupler PC of the charger CH. The emitter of the switch 348 is grounded. The base potential of the switch 348 is controlled by the MPU 39.

The charger CH1 includes a power supply (12 V), a charging start button ST, a contactor-on relay CO, and a photocoupler PC.

The precharge start button ST switches the connection of the power supply (12 V) of the charger CH1 with the anode of the first insulating switch 342 and with the anode of the second insulating switch 344.

The precharge sub-contactors 25A, 25B are set to the connection state based on the potential difference between the first charging start signal line L1 and the second charging start signal line L2, when the contactor driver 38 is turned on. The contactor driver 38 is switched between connection and disconnection by the MPU 39.

As the user pushes the charging start button ST, the power supply (12 V) of the charger CH1 is connected to the first insulating switch 342, and the first insulating switch 342 is connected (ON). As the first insulating switch 342 is connected, the MPU 39 of the charging ECU 30 detects that the user has requested for start of charging (it detects the charging start signal).

Then, as the contactor-on relay CO is connected, the power supply (12 V) of the charger CH1 and the second insulating switch 344 are connected, the second insulating switch 344 is connected (ON), and the charging start signal is sent to the second charging start signal line L2. The connection and disconnection of the contactor-on relay CO is controlled by the charger CH1 on the basis of the control signal output from the MPU 39 of the charging ECU 30.

When the charger CH1 connects the contactor-on relay CO, the first charging start signal line L1 and the second charging start signal line L2 are grounded, and the charging sub-contactors 25A, 25B are connected.

Here, judgment is made by the MPU 39 of the charging ECU 30 on whether or not the number of the connected first insulating switches 342 and the number of the third insulating switches 346 are equal to each other. If the judgment result is YES, the MPU 39 makes the CAN communication and sends the onboard battery information (maximum voltage, capacity of the battery banks, the longest charging time, etc.) to the chargers CH1 through CH3. On the other hand, if it is determined that the number of the connected first insulating switches 342 and the number of the connected third insulating switches 346 are not equal to each other, the MPU 39 standby for a while, and then, by the CAN communication, sends a charging error signal to the chargers CH1 through CH3 and notifies the user via the vehicle ECU 10 that there is a charging error.

Figure 3:
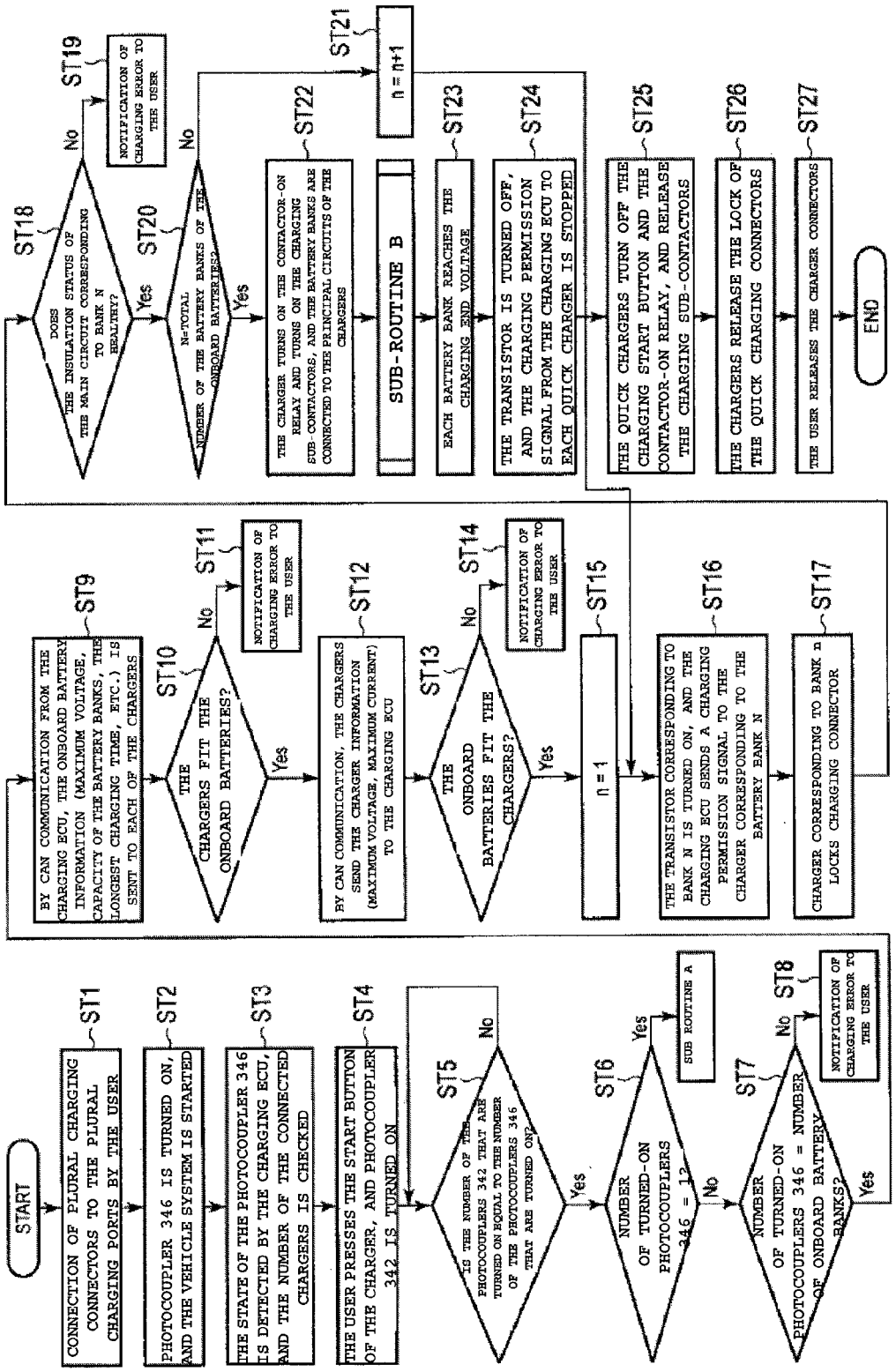
FIG. 3 is a flow chart illustrating an example of the charging method of the electrically driven automobile and the battery pack according to the first embodiment.

FIG. 3 is a flow chart illustrating an example of the charging method for the electrically driven automobile and battery pack in the embodiment.

First of all, the user connects the charging connectors CN1 through CN3 of the chargers CH1 through CH3 in one-to-one to the plural charging ports 401 through 403 on the vehicle side (step ST1).

After connection of the charging connectors CN1 through CN3, the third insulating switches 346 of the analog interfaces 34A through 34C of the charging ECU 30 (as shown in FIG. 2) are connected, and the electrically driven automobile is started (step ST2).

Then, the connection state of the third insulating switches 346 (shown in FIG. 2) is detected by the MPU 39 of the charging ECU 30, and the number of the charging connectors CN1 through CN3 connected to the electrically driven automobile is detected (step ST3).

The user then presses the charging start button ST of the chargers CH1 through CH3 so that the first insulating switches 342 (shown in FIG. 2) is connected, and the MPU 39 of the charging ECU 30 detects that the user makes a request for start of charging (step ST4).

Here, the MPU 39 of the charging ECU 30 checks whether or not the number of the connected first insulating switches 342 is the same as the number of the connected third insulating switches 346 (step ST5). If the numbers are the same, the MPU 39 checks whether or not the number of the connected first insulating switches 342 is 1 (step ST6). In step ST5, if the numbers of the first insulating switches 342 do not coincide with the numbers of the third insulating switches 346 within a predetermined time, charging error information can be provided to a user.

Figure 4:
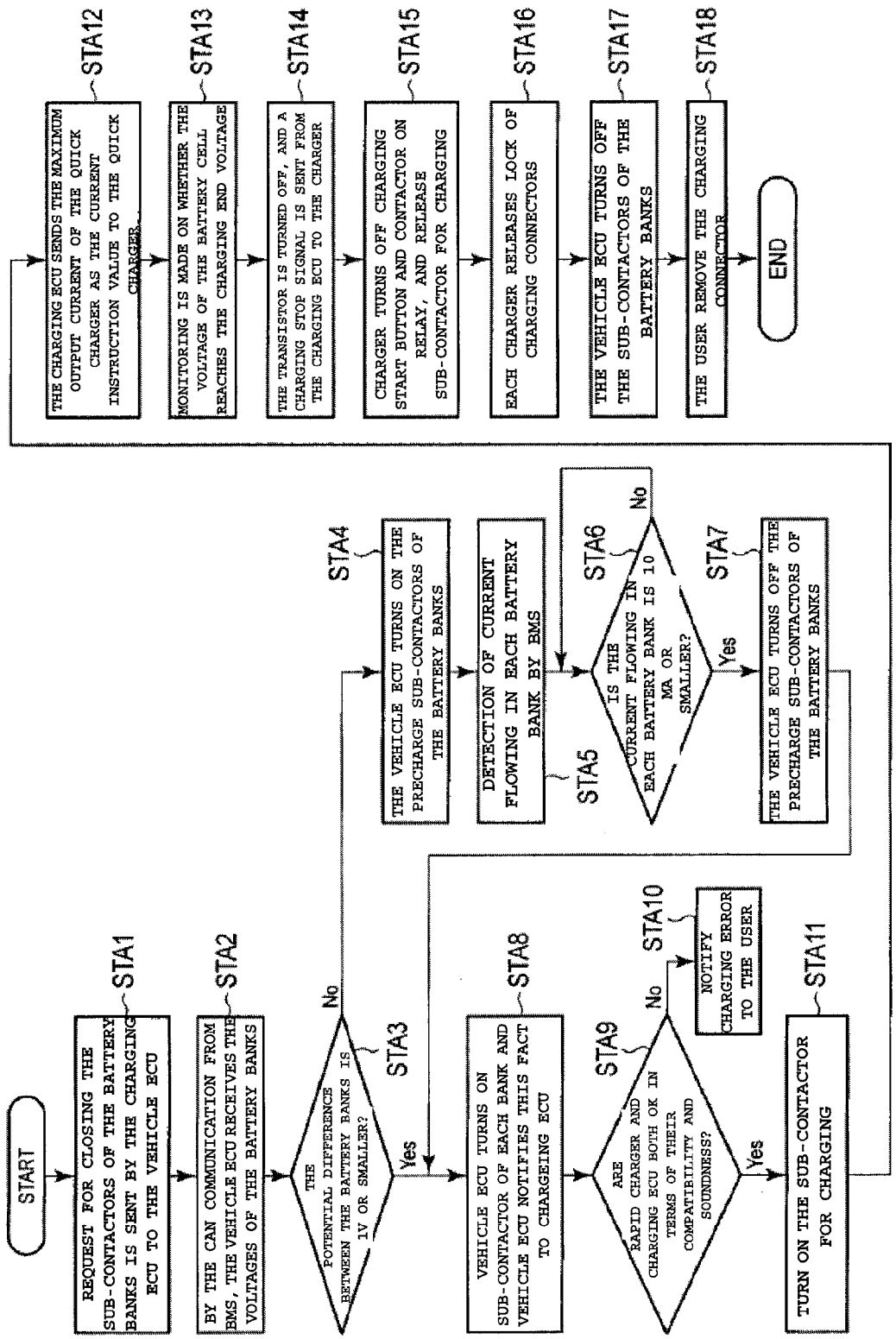
FIG. 4 is a flow chart illustrating an example of the subroutine A in the flow chart shown in FIG. 2.

If the number of the connected first insulating switches 342 is 1, the MPU 39 executes the sub-routine A shown in FIG. 4.

When the number of the connected first insulating switches 342 is not 1, the MPU 39 further checks whether or not the number of the connected first insulating switches 342 is equal to the number of the battery banks BT1 through BT3 of the electrically driven automobile (step SAT7).

If the number of the connected first insulating switches 342 is equal to the number of the battery banks BT1 through BT3, the MPU 39 carries out the CAN communication to send the onboard battery information (maximum voltage, capacity of the battery banks, the longest charging time, etc.) to the chargers CH1 through CH3 (step ST9).

On the other hand, if the numbers are not the same, after standby for a predetermined time, the MPU 39 sends a charging error signal to the chargers CH1 through CH3, and, at the same time, it notifies the user about the charging error via the vehicle ECU 10. Then, the process comes to an end (step ST8).

On the basis of the received onboard battery information, the chargers CH1 through CH3 judge whether or not the battery banks BT1 through BT3 fit the chargers CH1 through CH3 (step ST10).

If the battery banks BT1 through BT3 do not fit the chargers CH1 through CH3, the chargers CH1 through CH3 sends a charging error signal to the charging ECU 30 by means of the CAN communication, and it notifies the user about the charging error via the vehicle ECU 10. The process then comes to an end (step ST11).

On the other hand, if the battery banks BT1 through BT3 fit the chargers CH1 through CH3, the chargers CH1 through CH3 carry out the CAN communication to send the information (maximum voltage, maximum current, etc.) of the chargers CH1 through CH3 to the charging ECU 30 (step ST12).

On the basis of the received information of the chargers CH1 through CH3, the MPU 39 of the charging ECU determines whether or not the chargers CH1 through CH3 fit the battery banks BT1 through BT3 (step ST13).

When the chargers CH1 through CH3 do not fit the battery banks BT1 through BT3, the MPU 39 carries out the CAN communication to send a charging error signal to the chargers CH1 through CH3, and it notifies the user about the charging error via the vehicle ECU 10. The process then comes to an end (step ST14).

Then, the MPU 39 sets n=1 (step ST15).

Then, the MPU 39 controls to connect the switch 348 (shown in FIG. 2), and sends a charging permission signal to the charger CHn corresponding to the battery bank BTn (step ST16).

Then, upon receiving the charging permission signal, the charger CHn locks the charging connector CNn (step ST17).

Then, the MPU 39 determines whether or not the insulation state between the battery bank BTn and the principal circuit is perfect (step ST18). The chargers CH1 through CH3, which have detected the charging permission signal, lock the charging connectors CN1 through CN3 locked, carry out the test to check the insulation of the principal circuit (short circuit, short circuit to ground, etc.), and check whether or not the soundness of the principal circuit is guaranteed. In order to prevent mis-detection in checking the insulation, it is preferred that the flow of the checkup test of the insulation from the charging permission signal be carried out for each charger.

Then, the MPU 39 checks whether or not n is the total number of the battery banks BT1 through BT3 (step ST20). If n is not the total number of the battery banks BT1 through BT3, 1 is added to n, and the operation of steps ST16 through ST20 is executed again (step ST21).

On the other hand, if n is the total number of the battery banks BT1 through BT3, on the basis of the control signal from the MPU 39, the chargers CH1 through CH3 connect the contactor-on relay CO (ON), connect the charging sub-contactors 25A through 25F that connect the chargers CH1 through CH3 and the battery banks BT1 through BT3 (ON), and connect the battery banks BT1 through BT3 and the principal circuits of the chargers CH1 through CH3 with each other, respectively (step ST22).

Then, the MPU 39 carries out charging of the battery banks BT1 through BT3 according to the sub-routine B to be explained later.

When the MPU 39 finds that the battery banks BT1 through BT3 reach the final charging voltage (step ST23), the MPU 39 turns the switch 348 off, and stops the charging permission signal to the chargers CH1 through CH3 (step ST24).

When the charging permission signal is stopped, the chargers CH1 through CH3 turn off the charging start button ST and the contactor relay CO, and set the charging sub-contactors 25A through 25F to disconnection state (step ST25).

Then, the chargers CH1 through CH3 release the lock of the charging connectors CN1 through CN3 (step ST26), and the user pulls out the charging connectors CN1 through CN3 from the charging ports 401 through 403 (step ST27).

FIG. 4 is a flow chart illustrating an example of the sub-routine A in the flow chart shown in FIG. 3. Here, the sub-routine A is an example of the method for charging the plural battery banks BT1 through BT3 by one or several chargers that are connected when the number of the chargers connected to the electrically driven automobile is smaller than the total number of the battery banks. In this example, the explanation focuses on a condition where one charger CH1 is connected for charging the battery banks BT1 through BT3.

First of all, via the CAN interface circuit 36, the MPU 39 requests the vehicle ECU 10 to close the sub-contactors 23A through 23C of the battery banks BT1 through BT3 (step STA1).

Upon receiving the request for closing the sub-contactors 23A through 23C, the vehicle ECU 10 receives the voltages of the battery banks BT1 through BT3 from the battery management systems 21A through 21C by means of the CAN communication (step STA2).

Then, the vehicle ECU 10 compares the received voltages of the battery banks BT1 through BT3, and determines whether or not the potential difference between the battery banks BT1 through BT3 is smaller than a predetermined level (step STA3). Here, according to the present embodiment, judgment is made on whether or not the potential difference between the battery banks BT1 through BT3 is smaller than, e.g., 1 V.

If the potential difference between the battery banks BT1 through BT3 is larger than 1 V, the vehicle ECU 10 sets the precharge sub-contactors 24A through 24C to connection state (step STA4).

Then, the vehicle ECU 10 acquires from the battery management systems 21A through 21C the values of the currents flowing in the battery banks BT1 through BT3 (step STA5).

The vehicle ECU 10 then checks whether or not the values of the currents obtained from the battery management systems 21A through 21C is smaller than a predetermined value (step STA6). According to the present embodiment, the vehicle ECU 10 determines whether or not the values of the currents obtained from the battery management systems 21A through 21C is 10 mA or smaller.

Then, the vehicle ECU 10 carries out the operation of step STA6 repeatedly until the values of the currents obtained from the battery management systems 21A through 21C become 10 mA or smaller. Once the values of the currents obtained from the battery management systems 21A through 21C become 10 mA, the vehicle ECU 10 sets the precharge sub-contactors 24A through 24C to disconnection state (step STA7).

When the potential difference between the battery banks BT1 through BT3 is 1 V or smaller according to step STA3, and after end of the step STA, in the vehicle ECU 10 the sub-contactors 23A through 23C of the battery banks BT1 through BT3 are respectively connected, and notifies the charging ECU 30 about the connection of the sub-contactors 23A through 23C (step STA8).

Then, on the basis of the onboard battery information and the information of the chargers, the charger CH1 and the MPU 39 checks whether or not the battery banks ET1 through BT3 fit the charger CH1, and whether or not the soundness is guaranteed (step STA9).

When the charger CH1 and the MPU 39 judges that the battery banks BT1 through BT3 fit the chargers CH1, or there is no guarantee of soundness, they notify the user via the vehicle ECU 10 about the charging error (step STA10).

Then, the charger CH1 connects the contactor relay CO, and the MPU 39 controls to connect the contactor driver 38 so as to connect the charging sub-contactors 25A through 25F connected (step STA11).

When the charger CH1 and the MPU 39 judges that the battery banks BT1 through BT3 fit the charger CH1, and the soundness is guaranteed, the MPU 39 sends the maximum output current as the current instruction value to the charger CH1 (step STA12).

The charger CH1 starts charging according to the received current instruction value. The MPU 39 receives the voltages of the battery cells of the battery banks BT1 through BT3 from the battery management systems 21A through 21C, and monitor the voltages of the battery cells to see whether or not they reach the final changing voltage (step STA13).

When any of the battery cells of the battery banks BT1 through BT3 reaches the final charging voltage, the MPU 39 turns off the switch 348, and stops the charging permission signal to the charger CH1 (step STA14).

When the charging permission signal is stopped, the charger CH1 releases the connection of the charging start button ST and the contactor relay CO, and releases the connection of the charging sub-contactors 25A through 25F (step STA15).

Then, the charger CH1 releases the lock of the charging connector CN1 (step STA16).

Then, the vehicle ECU 10 releases the connection of the sub-contactors 23A through 23C of the battery banks BT1 through BT3, respectively (step STA17).

Finally, the user pulls out the charging connector CN1 from the charging port 401, and the charging operation comes to an end (step STA18).

Figure 5:
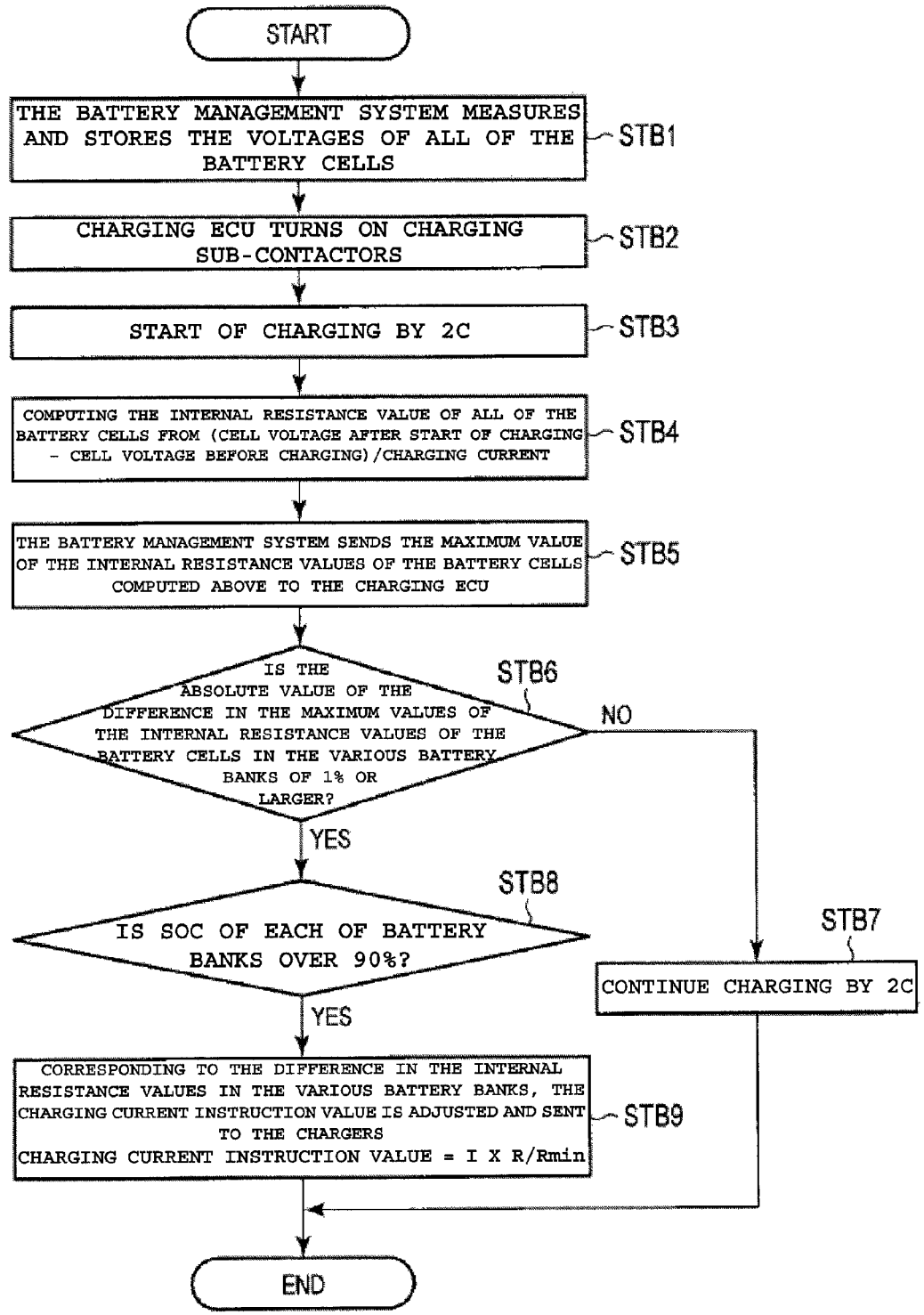
FIG. 5 is a flow chart illustrating an example of the subroutine B in the flow chart shown in FIG. 3.

FIG. 5 is a flow chart illustrating an example of the subroutine B in the flow chart shown in FIG. 3. In the following, an example of the method for deciding the charging current instruction sent from the charging ECU 30 to the chargers CH1 through CH3 will be explained. This control depends on the dispersion of the internal resistance of the battery cells at the end of the charging operation, and it is carried out for canceling the unbalance in voltage among the various battery banks.

First of all, before starting the charging operation, the battery management systems 21A through 21C measure the voltage (cell voltage V1 before charging) for each of all of the battery cells in the battery banks BT1 through BT3, and the voltages of all of the battery cells are stored in the memory of the battery management systems 21A through 21C. After end of storage of the voltages of the all of the battery cells, the battery management systems 21A through 21C carry out the CAN communication to send the charging start permission signal to the charging ECU 30 (step STB1).

Upon receiving the charging start permission signal, the MPU 39 of the charging ECU sends the charging current instruction to the chargers CH1 through CH3, respectively. According to the present embodiment, for example, the target is to complete the charging operation in about 30 min, and the charging current instruction is taken as 2C (step STB3).

Then, the MPU 39 notifies the chargers CH1 through CH3 to connect the contactor relay CO, and connects the charging sub-contactors 25A through 25F. Then, according to the received charging current instruction, the chargers CH1 through CH3 start the charging operation.

The battery management systems 21A through 21C then stores in a memory or the like all of the battery cell voltages (cell voltage V2 after start of charging) and the current I flowing in each of the battery banks BT1 through BT3 measured after a predetermined time since flow starts for the charging current (step STB3).

Then, the battery management systems 21A through 21C carry out the following arithmetic and logic operation to compute the internal resistance value for each of all of the battery cells (step STB4).

Internal resistance value $R$=(cell voltage $V2$ after start of charging–cell voltage $V1$ before charging)/$I$ Then, the battery management systems 21A through 21C send the maximum value of the internal resistance value R for each of the battery banks BT1 through BT3 to the charging ECU 30 (step STB5).

Then, the MPU 39 of the charging ECU 30, which has received the maximum value of the internal resistance value R of the battery cells, works as follows: the smallest internal resistance value among the internal resistance values R of the battery cells that have been received is taken as a reference (=100%) to compute the ratios of the other internal resistance values R; and judgment is made on whether or not the absolute value of the difference of the ratio of the internal resistance value R from the reference is a predetermined value or smaller (step STB6).

For example, suppose the maximum value of the internal resistance value R of all of the battery cells of the battery bank BT1 is R1, the maximum value of the internal resistance value R of all of the battery cells of the battery bank BT2 is R2, and the maximum value of the internal resistance value R of all of the battery cells of the battery bank BT3 is R3, in the following explanation, it is assumed that there is the relationship of R1<R2<R3.

In this case, the MPU 39 takes the internal resistance value R1 as the reference (100%) in computing the ratios of the other internal resistance values R2 and R3 with respect to the internal resistance value R1 (R2/R1×100%, R3/R1×100%). Then, it determines whether or not the absolute value of the difference between the computed ratio and the reference value (100%) is 1% or smaller.

If the difference of the absolute value is 1% or smaller, the MPU 39 does not change the current instruction value. Consequently, charging is carried out in 2C until any of the battery cells become the final changing voltage (step ST7).

On the other hand, if the difference of the absolute value is over 1%, the MPU 39 monitors the SOC (state of charge) of the battery banks BT1 through BT3, and checks whether or not the SOC (%) of the battery banks BT1 through BT3 reaches a predetermined level (e.g., 90%) (step ST8). In this case, the MPU 39 computes the SOC % from, e.g., the voltages of the battery cells received from the battery management systems 21A through 21C. Here, the SOC % monitored by the MPU 39 refers to the proportion with respect to the target charge of the battery banks BT1 through BT3 taken as 100%. Here, the fully charged charge is not limited to 100%. In addition, the MPU 39 monitors the voltages of the battery banks BT1 through BT3 and checks whether or not the voltage has reached the predetermined level.

When the SOC of the battery banks BT1 through BT3 reaches the predetermined level, the MPU 39 computes the charging current instruction value when the battery bank nears the end of charging (e.g., about SOC 90%) corresponding to the ratio of the internal resistance value computed before.

For example, suppose the Rmin (the minimum value of the internal resistance value R):R1=1:1, the charging current instruction value for the battery bank BT1 is set at I×(1/1).

For example, suppose the Rmin (the minimum value of the internal resistance value R):R2=1:1.015, the charging current instruction value for the battery bank BT2 is set at I×(1/1.015).

For example, suppose the Rmin (the minimum value of the internal resistance value R):R3=1:1.018, the charging current instruction value for the battery bank BT3 is set at I×(1/1.018).

As explained above, the charging current instruction value is computed for each of the battery banks BT1 through BT3, and the computed charging current instruction values computed in this way are sent to the corresponding chargers CH1 through CH3, respectively (step STB9).

Then, the battery banks BT1 through BT3 are all charged to reach the charging end voltage (step ST22), and the charging operation comes to an end according to the flow chart shown in FIG. 3.

As explained above, it is possible to shorten the charging time for the battery pack carried onboard the electrically driven automobile by charging with the chargers CH1 through CH3 corresponding to the plural battery banks BT1 through BT3 connected in parallel with the principal circuit.

In addition, when charging is carried out by the chargers CH1 through CH3 corresponding to the battery banks BT1 through BT3, by adjusting the charging current instruction values corresponding to the internal resistance value R of the battery cells, it is possible to decrease the potential difference between the battery banks BT1 through BT3 when charging comes to an end.

Figure 6:
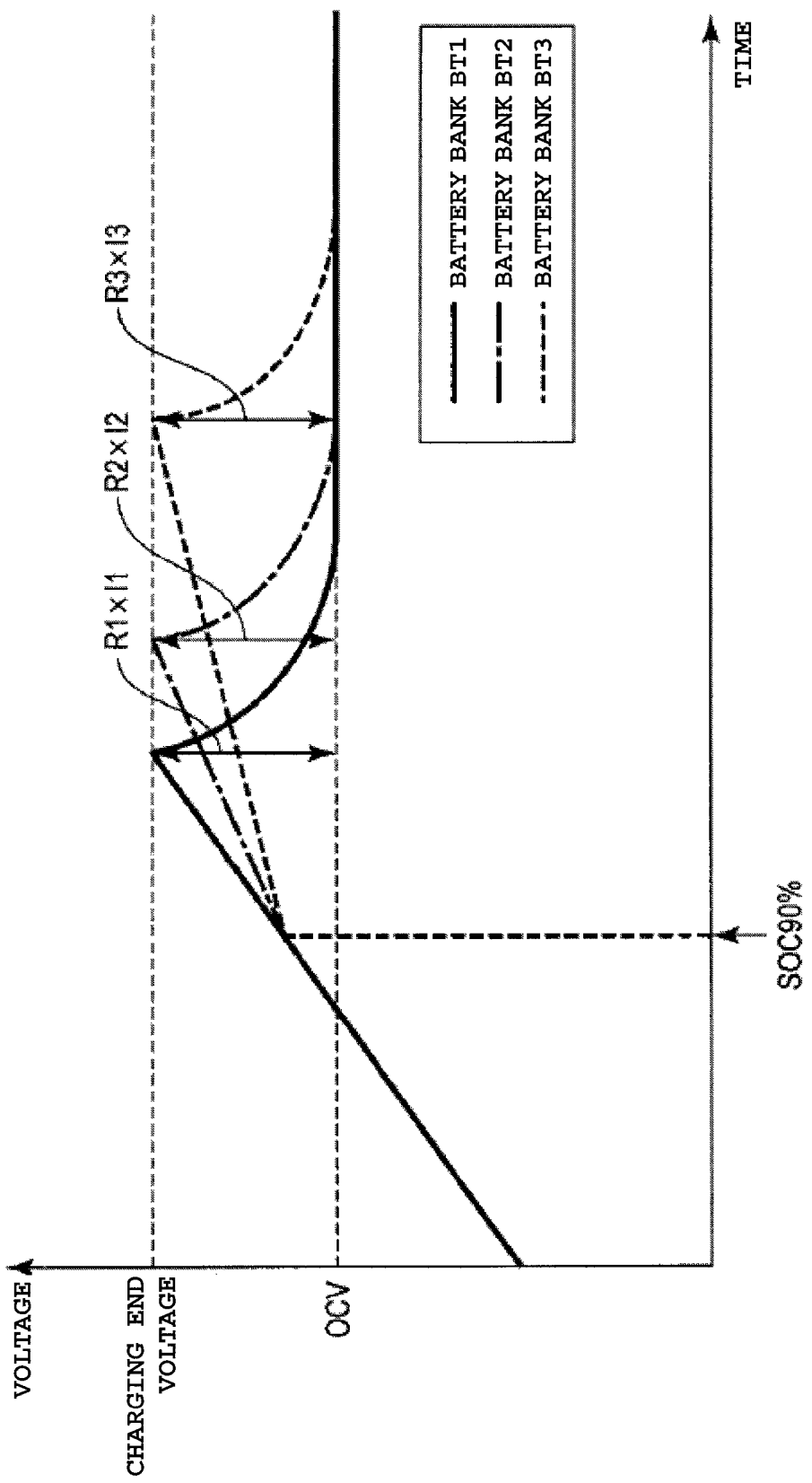
FIG. 6 is a diagram illustrating an example of the voltages of multiple battery banks over time when the charging currents are adjusted corresponding to internal resistance values.

FIG. 6 is a diagram illustrating an example of the voltages of the battery banks BT1 through BT3 over time when the charging current is adjusted corresponding to the internal resistance value.

After charging to the charging end voltage (=Open voltage OCV:Open Circuit Voltage+R1), the voltage of the battery banks BT1 through BT3 falls by a value obtained by multiplying the internal resistance value R to the charging current I. Consequently, when the same charging current is used to charge the battery banks BT1 through BT3 while the battery banks BT1 through BT3 have different internal resistances, a potential difference takes place among the battery banks BT1 through BT3 after charging. According to the present embodiment, the charging current is adjusted corresponding to the internal resistance value of the battery cells of the battery banks BT1 through BT3 so that the decreased voltages after charging are equal to each other (R1×I1=R2×I2=R3×I3 in this case). As a result, the potential difference among the battery banks BT1 through BT3 after charging becomes smaller, and it is thus possible to avoid a large current from flowing in the battery banks BT1 through BT3 when the battery banks BT1 through BT3 are connected in parallel with each other. At the same time, there is no need to decrease the potential difference caused by precharge or the like after charging, so that it is possible to shorten the charging time.

Also, corresponding to the capacity of the battery pack carried onboard the electrically driven automobile, as the capacity of the charger is increased, the weight and size of the connectors and cables, etc. increase, so that the operability by the user may degrade, and, at the same time, the cost rises due to adoption of the charger with a higher capacity. Now, according to the present embodiment, by using plural related chargers, it is possible to finish charging in a short time even though the capacity of the battery packs increase.

Consequently, according to the present embodiment, it is possible to provide a battery pack and an electrically driven automobile that allow charging in a short time.

In the following, the battery pack and the electrically driven automobile according to the second embodiment will be explained with reference to the drawings. The same keys as those in the above in the first embodiment will be adopted in the following explanation, so that they will not be explained in detail again. The battery pack and the electrically driven automobile in this embodiment have the rated voltage of the onboard battery of the maximum voltage of the charger (e.g., 500 V) or more.

Figure 7:
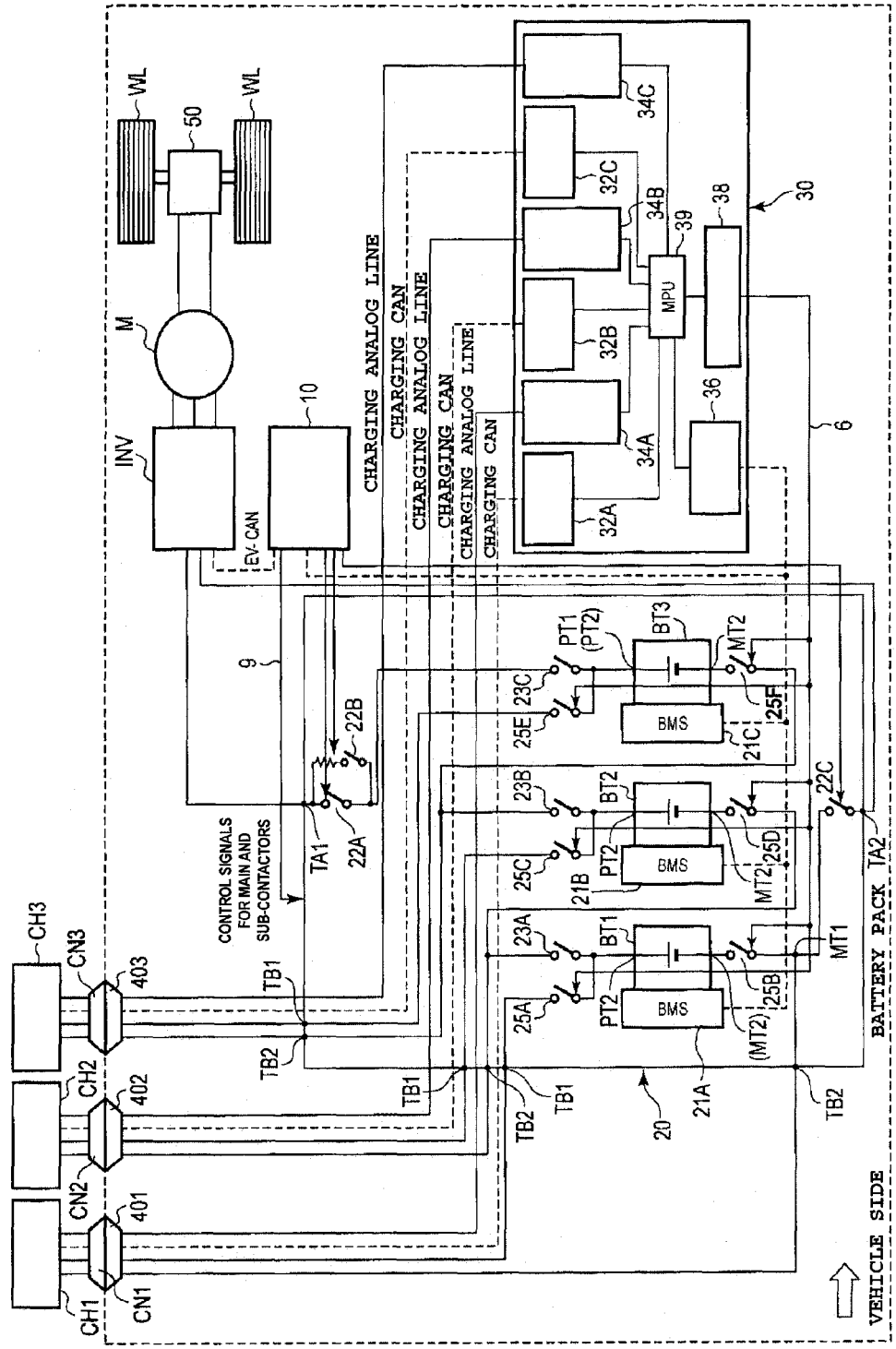
FIG. 7 is a schematic diagram illustrating a battery pack and an electrically driven automobile according to a second embodiment.

FIG. 7 is a schematic diagram illustrating a battery pack and an electrically driven automobile of the second embodiment. In the first embodiment, the battery banks BT1 through BT3 are connected in parallel with the principal circuit. Now, in the present embodiment, the battery banks BT1 through BT3 are connected in series with the principal circuit.

The first main contactor 22A switches the connection between the first charging/discharging terminal TA1 and the positive electrode terminals PT2 of the battery bank BT3. The third main contactor 22C switches the connection between the second charging/discharging terminal TA2 and the negative electrode terminals MT2 of the battery bank BT1. That is, according to the present embodiment, the positive electrode terminals PT1 of the plural battery banks BT1 through BT3 are shared with the positive electrode terminals PT2 of the battery bank BT3, and the negative electrode terminals MT2 of the plural battery banks BT1 through BT3 are shared with the negative electrode terminals MT2 of the battery bank BT1.

The sub-contactors 23A switch the electrical connection between the positive electrode terminals PT2 of the battery bank BT1 and the negative electrode terminals MT2 of the battery bank BT2. The sub-contactors 23B switch the electrical connection between the positive electrode terminals PT2 of the battery bank BT2 and the negative electrode terminals MT2 of the battery bank BT3. The sub-contactors 23C switch the electrical connection between the positive electrode terminals PT2 of the battery bank BT3 and the principal circuit. The electrical connection between the negative electrode terminals MT2 of the battery bank BT1 and the principal circuit is switched by the charging sub-contactor 25B.

The charging sub-contactors 25A through 25F switch the electrical connection between the positive electrode terminals PT2 and the negative electrode terminals MT2 of the battery banks BT1 through BT3 and the charging ports 401 through 403.

According to the present embodiment, the battery pack 20 includes three first charging terminals TB1 connected to the positive electrode terminals PT2 of the three battery banks BT1 through BT3, respectively, and three second charging terminals TB2 connected to the negative electrode terminals MT2 of the three battery banks BT1 through BT3.

According to the present embodiment, as the battery banks BT1 through BT3 are connected in series with each other, there is no need to include a precharge sub-contactor.

Otherwise, the configuration of this embodiment is the same as that of the battery pack and the electrically driven automobile in the first embodiment.

According to the present embodiment, during the operation for charging the battery pack and the electrically driven automobile, there is no need to carry out the precharge for the battery banks BT1 through BT3 as would be carried out in steps STA3 through STAT shown in FIG. 4. Also, there is no need to carryout the steps in FIG. 5 for adjusting the charging current instruction value of the battery banks BT1 through BT3 corresponding to the internal resistance value.

According to the battery pack and the electrically driven automobile of the present embodiment, just as in the first embodiment, by means of charging with the chargers CH1 through CH3 corresponding to the plural battery banks BT1 through BT3 connected in parallel with the principal circuit, it is possible to shorten the charging time of the battery carried onboard the electrically driven automobile.

Also, corresponding to the capacity of the battery pack carried onboard the electrically driven automobile, as the capacity of the charger is increased, the weight and size of the connectors and cables, etc. increase, so that the operability by the user may degrade, and, at the same time, the cost rises due to adoption of the charger with a higher capacity. Now, according to the present embodiment, by using plural conventional chargers, it is still possible to finish charging in a short time even though the capacity of the battery packs increase.

Consequently, according to the present embodiment, it is possible to provide a battery pack and an electrically driven automobile that allow charging in a short time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery pack, comprising:
    plural battery banks each including plural battery cells, which are connected in parallel with each other;
    a battery management system configured to detect currents flowing in the battery banks, and voltages and temperatures of the plural battery cells;
    a first charging/discharging terminal connected to positive electrode terminals of the plural battery banks;
    a second charging/discharging terminal connected to negative electrode terminals of the plural battery banks;
    plural first charging terminals connected to the positive electrode terminals of the plural battery banks, respectively;
    a second charging terminal connected to the negative electrode terminals of the plural battery banks;
    main contactors configured to switch the connection between the positive electrode terminals of the plural battery banks and the first charging/discharging terminal, and the connection between the positive electrode terminals of the plural battery banks and the second charging/discharging terminal;
    sub-contactors configured to switch the connection between the positive electrode terminals of the plural battery banks and the first charging/discharging terminal, respectively; and
    charging sub-contactors configured to switch the connection between the positive electrode terminals of the plural battery banks and the first charging terminal, and the connection between the negative electrode terminals of the plural battery banks and the second charging terminals, respectively.

2. An electrically driven automobile including the battery pack according to claim 1, the electrically driven automobile further including:
    plural charging ports connected to the first charging terminals and the second charging terminals;
    a charging electric control unit including plural first interface circuits configured to carry out communication with plural chargers connected to the charging terminals via the plural charging ports, a contactor driving circuit configured to control the operation of the charging sub-contactors, a second interface circuit configured to carryout communication with the battery management system, and a processing unit configured to carry out communication with the plural chargers via the first interface circuits and communication with the battery management system via the second interface circuit;
    an inverter that is connected to the first charging/discharging terminal and the second charging/discharging terminal and configured to convert DC power output from the plural battery banks to AC power;
    a motor to be driven by the AC power output from the inverter;
    a power transmission unit configured to transmit power of the motor to vehicle shafts and driving wheels; and
    a vehicle electric control unit configured to control operation of the main contactors and the sub-contactors.

3. The electrically driven automobile according to claim wherein
    the battery management system is configured to compute internal resistance values of the battery cells from the voltage of the battery cells, and
    the processing unit, when plural chargers are connected to the plural charging ports, is configured to operate the charging sub-contactors so that the plural battery banks and the plural chargers are connected to each other one-to-one, determine whether or not an absolute value of difference between maximum values in the battery banks of the internal resistance values of the battery cells received from the battery management system exceeds a predetermined level, and, when the absolute value exceeds the predetermined level, adjust a charging current instruction value for each battery bank.

4. The electrically driven automobile according to claim 3, wherein
    the charging electric control unit is configured to compare the maximum values of the internal resistance values of the plural battery cells in each of the plural battery banks to each other, compute ratios of the internal resistance values to a reference resistance value equal to the smallest internal resistance value, and, when voltages of the plural battery banks reach the predetermined value, send charging current instructions each of which is adjusted by multiplying the charging current instruction values by a coefficient corresponding to the computed ratio thereof, to the plural chargers, respectively.

5. The electrically driven automobile according to claim 2, wherein
    the vehicle electric control unit is configured to release the connection of the sub-contactors when an off ignition signal is received.

6. A battery pack, comprising:
    plural battery banks each including plural battery cells, which are connected in series with each other;
    battery management systems configured to detect currents flowing into the battery banks, and voltages and temperatures of the plural battery cells;
    a first charging/discharging terminal connected to positive electrode terminals of the plural battery banks;
    a second charging/discharging terminal connected to negative electrode terminals of the plural battery banks connected in series with each other;
    plural first charging terminals connected to the positive electrode terminals of the plural battery banks, respectively,
    plural second charging terminals connected to the negative electrode terminals of the plural battery banks, respectively;
    main contactors configured to switch the connection between the positive electrode terminals of the plural battery banks and the first charging/discharging terminal, and the connection between the positive electrode terminals of the plural battery banks and the second charging/discharging terminal;
    sub-contactors configured to switch the connection between the positive electrode terminals of the plural battery banks and the first charging/discharging terminal; and
    charging sub-contactors configured to switch the connection between the positive electrode terminals of the plural battery banks and the first charging terminal, and the connection between the negative electrode terminals of the plural battery banks and the second charging terminals, respectively.

7. An electrically driven automobile including the battery pack according to claim 6, the electrically driven automobile further including:
    plural charging ports connected to the first charging terminals and the second charging terminals;
    a charging electric control unit including plural first interface circuits configured to carry out communication with plural chargers connected to the charging terminals via the plural charging ports, a contactor driving circuit configured to control operation of the charging sub-contactors, a second interface circuit configured to carryout communication with the battery management system, and a processing unit configured to carry out communication with the plural chargers via the first interface circuits and communication with the battery management system via the second interface circuit;

an inverter configured to convert DC power output from the plural battery banks to AC power;

a motor connected to the first charging/discharging terminal and the second charging/discharging terminal and to be driven by the AC power output from the inverter;

a power transmission unit configured to transmit power of the motor to vehicle shafts and driving wheels; and a vehicle electric control unit configured to control the operation of the main contactors and the sub-contactors.

8. The electrically driven automobile according to claim 6, wherein the vehicle electronic control unit is configured to release the connection of the sub-contactors when an off ignition signal is received.

\* \* \* \* \*